April 8, 1958

J. P. SELBERG ET AL 2,829,741

TELESCOPING SELF-ERECTING DERRICK STRUCTURE

Filed April 25, 1951

INVENTORS.
JOHN P. SELBERG
ARNOLD A. KAHN.
BY

ATTORNEYS.

April 8, 1958     J. P. SELBERG ET AL     2,829,741
TELESCOPING SELF-ERECTING DERRICK STRUCTURE
Filed April 25, 1951     6 Sheets-Sheet 4

INVENTORS.
JOHN P. SELBERG
ARNOLD A. KAHN
BY
ATTORNEYS.

April 8, 1958     J. P. SELBERG ET AL     2,829,741
TELESCOPING SELF-ERECTING DERRICK STRUCTURE
Filed April 25, 1951     6 Sheets-Sheet 6

INVENTORS.
JOHN P. SELBERG
ARNOLD A. KAHN
BY
ATTORNEYS.

United States Patent Office 2,829,741
Patented Apr. 8, 1958

2,829,741

TELESCOPING SELF-ERECTING DERRICK STRUCTURE

John P. Selberg, Los Angeles, and Arnold A. Kahn, Torrance, Calif., assignors to Ideco, Inc., a corporation of Ohio Application April 25, 1951, Serial No. 222,888

5 Claims. (Cl. 189—14)

The present invention relates generally to well drilling and servicing rigs, and more particularly, to a transportable, self-erecting derrick especially adapted for the servicing and drilling of oil wells.

It is general practice in most oil fields that when a well is completed, the permanent derrick structure employed during the drilling operations is dismantled and the well is thereafter serviced by the use of a portable derrick. Furthermore, it has become common practice to employ portable derricks even in the initial drilling of wells of shallow to medium depth. Wells and earth bores of types other than oil wells are, for the most part, drilled with portable drilling rigs.

For maximum efficiency in operations of this sort, it is desirable that the portable derrick employed be entirely prefabricated so as to require no substantial construction work at the well site, that the derrick be rapidly and efficiently raised from a transporting position to an operating position, and that the structure be, in all respects, safe, both during the erecting thereof and during the drilling operations performed thereafter.

Due to the fact that wells, and other earth bores drilled with portable rigs in comparatively recent times, have been considerably deeper than heretofore, it is necessary that the modern portable derrick be substantially as strong and rigid as the permanent structures heretofore employed. Yet, it should be noted, such strength and rigidity must not detract from the portability of the structures or from the ease of erecting the same.

In order to make derrick structures portable over curving roads and maneuverable in other relatively restricted situations, it has been common practice to construct the derrick mast in two or more telescoping sections, which sections are extended into operating position at the well site. Particular problems raised by the use of such telescoping masts are those of rigidity, safety and accurate placement of the top of the derrick over the well which it is desired to operate on. Means should be provided in telescoping derrick equipment so that if the raising mechanism fails during the extending of the sections into operating positions, the partially raised sections will not drop and cause destruction of the equipment and possible injury to personnel.

It is also important that the portable mast, when erected, be of such design that the crown block loads occasioned by hoisting, etc., be transmitted directly through aligned connections to the ground-engaging base members. This efficient transfer of thrust load from one section of the mast to another becomes difficult as the number of parallel columns is increased. For example, in a four-legged mast having four ground-engaging base members, there is a considerable amount of inherent kinematic redundancy whereby a slight settling of the ground under one or another of the base members causes a shift in the loads which may so overload one of the remaining columns as to cause the mast to collapse. Accordingly, it is desirable that the number of columns making up the mast be as few as possible and the load transfer points between successive mast sections be as nearly directly one above the other as is possible.

Additionally, it is necessary that once the telescoping sections have been raised into operating position, that they be securely locked together so as to form, in effect, a single rigid column. Still further, it is desirable that the raising operation be performed with power equipment available in the ordinary derrick equipment, so as not to require the transporting of auxiliary raising means which has no further use after the derrick is once erected. Also it should be noted that whatever means are used to raise the derrick, they should not in any way interfere with the normal operation thereof once it is erected. In this connection, reference is made to United States Patent No. 2,781,108, issued February 12, 1957. Said patent describes one element of raising equipment which may be conveniently used in connection with the structure embodying the present invention.

Bearing in mind the foregoing discussion, it is a major object of the present invention to provide a well servicing and drilling derrick which is transportable in a prone and telescoped condition, and is adapted for relatively easy and efficient erection and extension at the well site.

It is another object of the present invention to provide a novel latch means for operative interconnection of successive mast sections at points substantially in a common plane with the crown block and footing whereby to transfer the vertical thrust from one section to the next, and which latch mechanism is self-engaging during extension of the telescoping mast sections, and is quickly and easily operable for disengagement when it is desired to lower or telescope the mast sections.

It is still another object of the invention to provide, in addition to the latch means just described, means for locking the mast sections rigidly against relative lateral movement when in extended operative position whereby to join the mast sections into an effective unitary rigid column.

A further object of the invention is to provide a safety catch which is effective in preventing the dropping of the upper mast section or sections in the event of failure of the raising or extending means during the raising operations.

A still further object of the invention is to provide a novel panel structure for mast sections which combines the advantages of a convenient ladder for operating personnel, and improves the girder strength of the mast sections.

Yet another object of the invention is to provide a novel hinge support for a lowermost derrick mast section which permits adjustment of such lower section prior to the raising of the upper sections so as to assure the proper attitude of the erected mast after it has been raised.

A still further object of the invention is to provide a derrick structure of the class described which is adapted to be raised and lowered without the use of extensive auxiliary power equipment which has no function during drilling or other service operations of the derrick.

The foregoing and additional objects and advantages of the invention will be apparent from the following detailed description of a portable derrick structure embodying the same, such consideration being given likewise to the attached drawings, in which:

Figure 2 is a fragmentary perspective view of the lower mast portion of the structure illustrated in Figure 1.

as seen from the front, driller's side, the derrick mast being shown in erect operative position;

Figure 3 is an elevational section taken on the line 3—3 in Figure 2;

Figure 4 is an elevational section taken on the line 4—4 in Figure 2;

Figure 1:
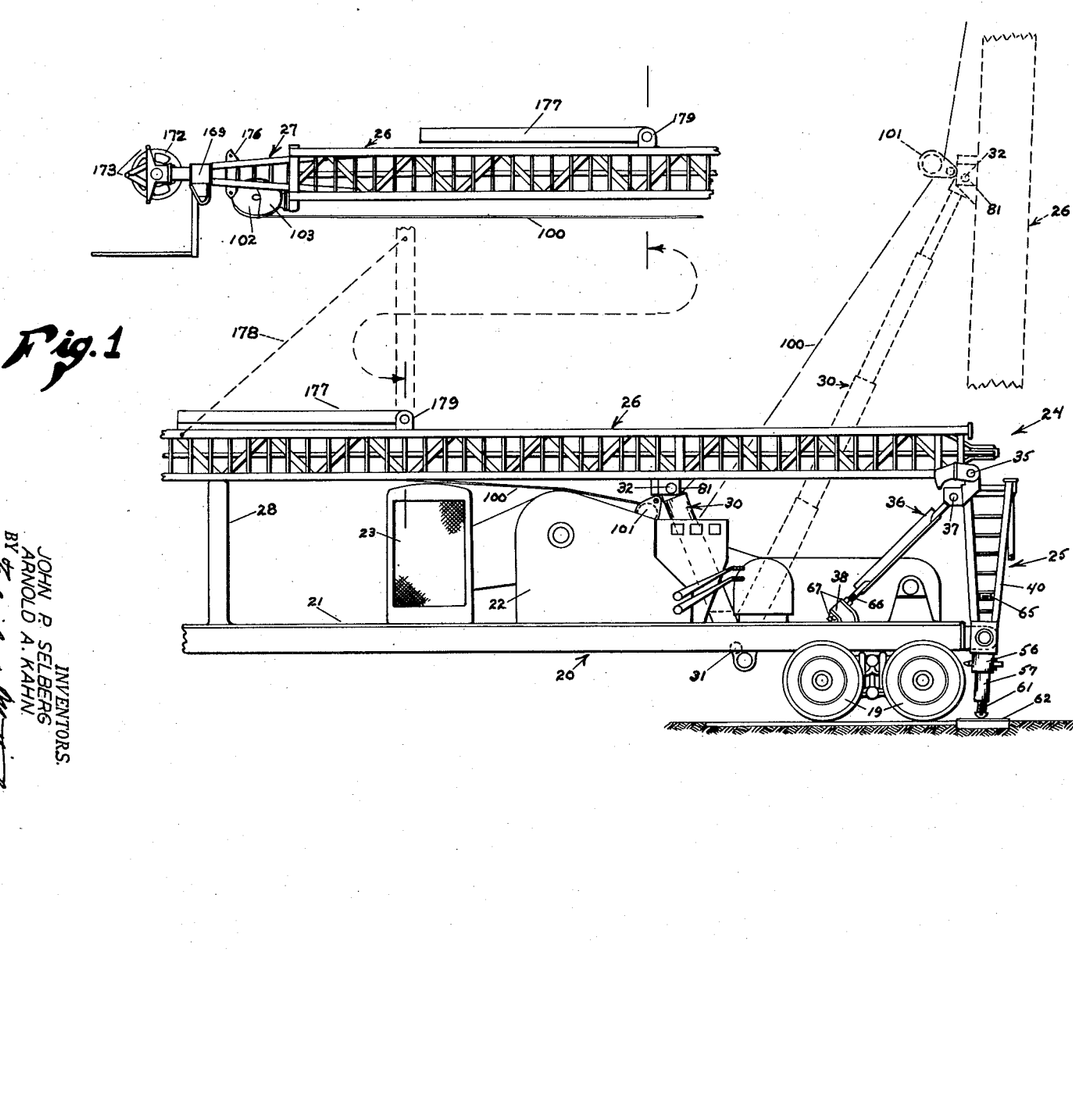
Figure 1 is a fragmentary side elevational view of a portable, self-erecting, telescoping derrick, the mast of the same being shown in prone transporting position in full line, and in operative upright position in phantom line.

Referring first to Figure 1 for a general description of a structure, it will be seen that the portable derrick embodying the present invention is mounted on a heavy-duty trailer having a base frame or chassis 20, rear wheels 19, and a conventional gooseneck with a king pin (not shown), by which the trailer may be secured to the usual truck-tractor unit to be towed in the usual manner.

*Note:*—The terms "front" and "rear," and the like, where used hereinafter with reference to the derrick, are applied to the operative positions of said structure, and not to its position on the trailer 20. Thus, it will be seen that the front of the derrick when in use is actually at the rear of the trailer 20.

A derrick floor 21 is formed on the chassis 20 and has mounted thereon a conventional draw works 22, powered by a prime mover 23, such as a diesel engine or the like, together with the concomitant controls for the draw works 22 and the prime mover 23. Also mounted on the chassis 20, adjacent the rearward end thereof, is a derrick mast 24 comprised of a base section 25, an intermediate section 26, and a top section 27. During transportation of the structure, the top section 27 is telescoped within the intermediate section 26, and these two sections are folded to a prone position substantially parallel to the trailer chassis 20 and are supported by a stanchion member 28, formed on the trailer chassis 20 adjacent the forward end thereof.

For the purpose of raising the mast 24 from its prone position shown in full line in Figure 1, to its erect position shown in phantom line therein, a telescoping hydraulically extendable strut 30 is provided, the lower end of which is pivotally attached to the frame of the chassis 20, as indicated at 31, and the upper end of which is pivotally attached to the intermediate mast section, as indicated at 32.

To provide for the raising and lowering of the intermediate and upper mast sections 26—27, the intermediate section 26 is hingedly secured to the base section 25 by a hinge connection having a transverse axis, as indicated at 35 in Figure 1. The base section 25 is held at a relatively fixed position on the chassis 20 by means of a bracing strut 36 during the raising or lowering operations. The bracing strut is pivotally secured to the base section 25 at 37, and adjustably anchored to the chassis 20 by means of an upstanding bracket 38, formed on the latter. The purpose of the adjustable connection at the bracket 38 will be described in more detail hereinafter.

Figures 2, 3, 4:
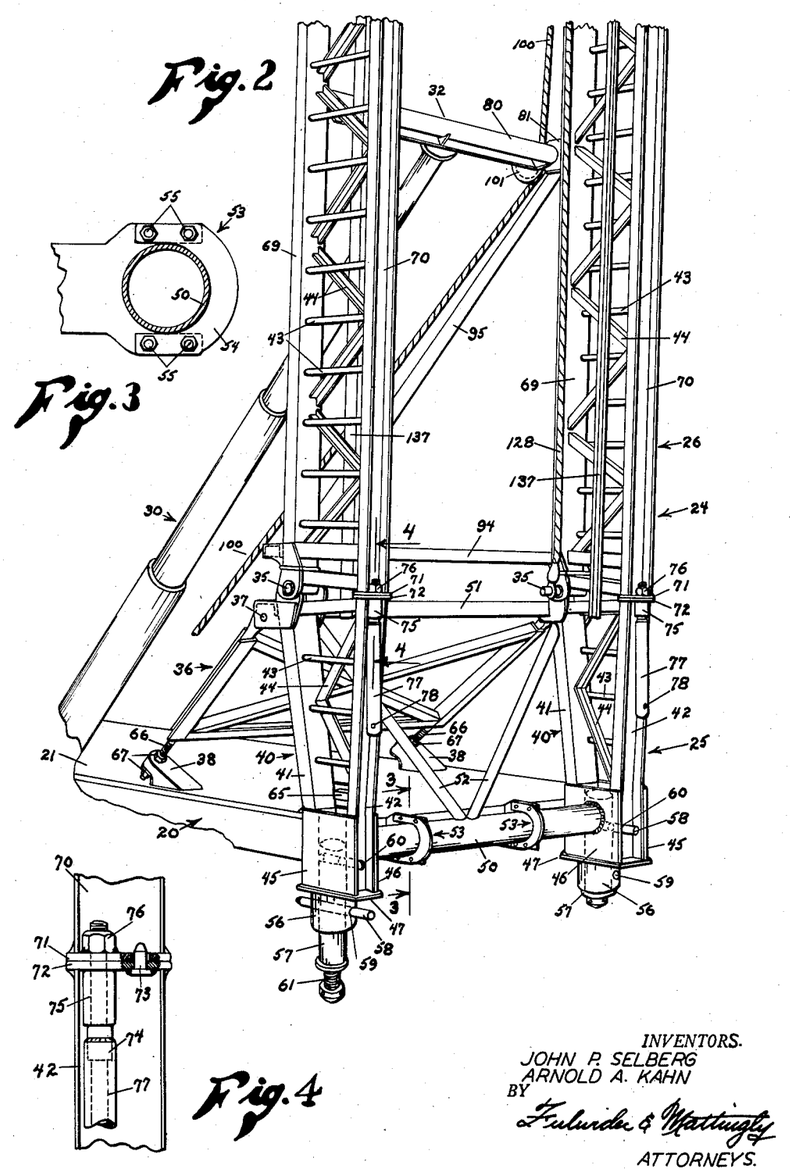

The structure and connection of the base section 25 is particularly illustrated in Figure 2. Here it will be seen that the base section 25 is comprised of a pair of side panels 40 each of which is, in turn, comprised of a pair of downwardly converging legs 41 and 42, interconnected by horizontal ladder rungs 43 and diagonal braces 44. It will be understood that each of the unitary mast sections is comprised of structural elements conventionally secured together as, for example, by welding. Where the legs 41 and 42 come together at the lower ends thereof, they are received in a box-like, welded structure comprising side plates 45 and 46, and a bottom plate 47.

The two lateral panels 40 of the base section 25 are secured together by a transverse hinge shaft 50, and also by an upper transverse member 51 and diagonal braces 52. The transverse hinge shaft 50 is pivotally secured to the rear end of the trailer chassis 20 by means of a pair of separable hinge bearing members 53, shown in detail in Figure 3. The outer half 54 of each hinge bearing member 53 may be removed by detaching bolts 55 whereby the entire base section 25 may be disconnected from the rear of the trailer chassis 20.

Secured to the lower end of the mast section base plates 47 and projecting downwardly therefrom, are collar-like extensions 56, each having a downwardly projecting pedestal leg 57 telescopingly received therein and securing in either of two alternate vertical positions by means of a transverse lock pin 58 received in appropriate apertures 59 or 60, either in the collars 56 or in the mast legs 41—42. During transportation, the legs 57 are retracted upwardly into the collars 56 and secured in that position by placing the lock pins 58 in the upper aperture 60. For purposes of illustration herein, the leg 57 to the right in Figure 2 is shown in retracted position.

Conventional threaded screw jacks 61 are formed in the lower ends of the legs 57, and may be adjustably extended to thrust against ground-engaging pads 62 (see Figure 1), thus to support the entire thrust load of the mast against the ground immediately to the rear of the trailer chassis 20.

As previously stated, it is one object of the invention to provide means by which the attitude of the erected derrick can be adjusted prior to the act of raising the mast. To this end, a level 65 of suitable conventional design (e. g., a spirit level) is fixedly mounted in one of the base section side panels 40. The adjustable brace strut is, as previously stated, adjustably secured to the chassis 20 by means of a downwardly extending threaded terminal rod 66 which passes through the anchor bracket 38 of the chassis 20 and is secured by means of a pair of nuts 67, engaging the bracket 38 above and below the same.

Thus, by appropriate manipulation of the nuts 67, the lower base section 25 may be pivoted forwardly or rearwardly about the axis of the hinge pin 50, so as to change the vertical disposition of the base section 25. As will hereinafter be described, the operative alignment of the intermediate mast section 26 with the base section 25, is fixed so that the initial adjustment of the base section 25 serves to align the entire mast when the same is erected and locked into operative position.

As can be seen best in Figure 2, the intermediate mast section 26 is, similarly to the base section 25, formed of lateral panels, each having rearward and forward legs 69 and 70, interconnected by ladder rungs 43 and diagonal braces 44. The rear legs 69 of the intermediate section are hinged to the rear legs 41 of the base section by separate hinge pins 35 aligned on a common transverse axis, whereby the intermediate mast section 26 may be folded rearwardly to lie prone on the trailer chassis 20, as previously described.

It will be seen, from an examination of Figure 2, that when the intermediate mast section 26 is erected to the position shown in full line therein, the forward legs 70 of the intermediate section 26 make abutting juncture with the forward legs 42 of the base section 25. Abutment plates 71 and 72 are secured to the legs 70 and 42, respectively, as shown in Figure 4, and an alignment pin 73 is secured, as for example, by welding, to one of the plates 72, and an appropriately aligned aperture formed in the other plate 71.

The plates 71—72 are held in their abutting contact by a removable bolt 74 received in a collar 75 welded to the lowermost plate 72, the bolt 74 being threadedly engaged with a nut 76 welded to the upper plate 71. The bolt 74 is formed with a downwardly extended head 77 having transverse capstan bores 78 therein, whereby the bolt may be tightened to lock the intermediate mast section 26 in upward alignment with the base section 25.

The hydraulic raising strut 30 is constructed in conventional manner of several telescoping sections, and has a hollow interior to receive hydraulic fluid under pressure whereby to extend the strut 30. The upper end of the strut is secured to a transverse hinge pin 80, the ends of which are pivotally received in appropriate hinge bearings 81 aligned on the transverse axis 32 and secured to the rear intermediate mast leg 69. Inasmuch as hydraulic pressure-operated devices are commonly used in connection with oil well drilling and servicing equipment, hydraulic fluid under pressure is conveniently available for the operation of the raising strut 30. Such hydraulic elements being well known in the art, further detailed description of the strut 30 and the operation thereof is deemed unnecessary herein.

Figure 5:
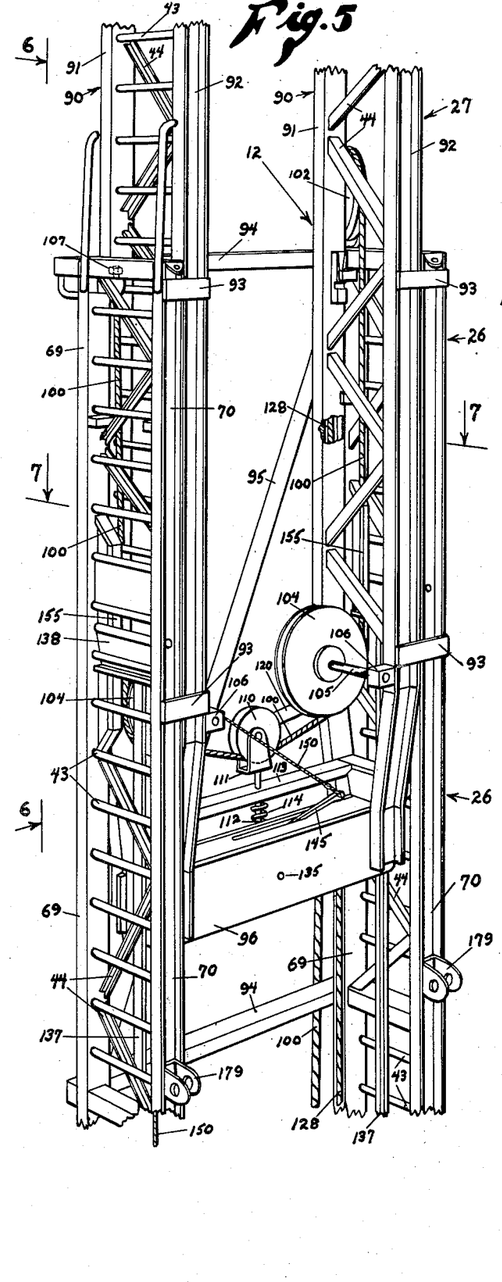
Figure 5 is a fragmentary perspective view of a mast portion adjoining that of Figure 2, looking in the same direction as Figure 2.
Figure 6:
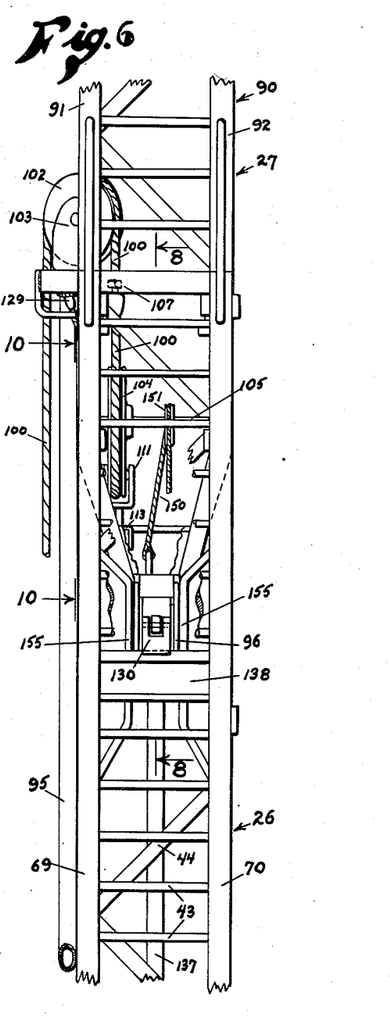
Figure 6 is a fragmentary elevational view looking in the direction of the arrows 6—6 in Figure 5.
Figure 7:
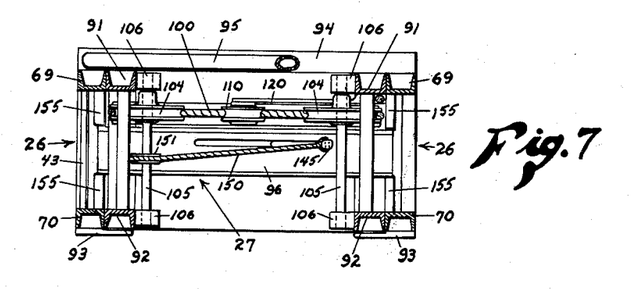
Figure 7 is a horizontal section taken on the line 7—7 in Figure 5.
Figure 10:
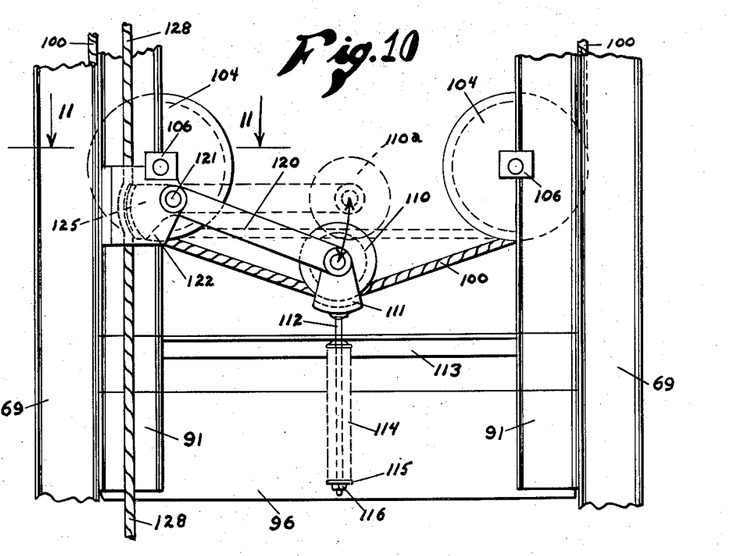
Figure 10 is a fragmentary elevational view looking in the direction of the arrows 10—10 in Figure 6.

Turning now to a discussion of the means for, and operation of raising the upper mast section 27 from its telescoped position within the intermediate section 26 to its extended operative position, reference should be had particularly to Figures 5, 6 and 10.

In Figures 5 and 6, the upper mast section 27 is shown in a partially raised position nearing the upper limit of its travel within the intermediate section 26. There it will be seen that the structural elements of the upper section 27 are similar to those of the other two sections comprising side panels 90, each comprised of a rear leg 91 and a forward leg 92 interconnected by rungs 43, and diagonal braces 44. It will be noted that the legs 91 and 92 of the upper section 27 are positioned in parallel sliding engagement with the respective legs 69 and 70 of the intermediate section, the upper section legs being against the inner surfaces of the intermediate section legs. The upper section is constrained to longitudinal movement within the intermediate section 26 by inwardly projecting guide tabs 93 secured to the front legs 70 of the intermediate section, and by horizontal girts 94 and diagonal braces 95 secured across the back of the intermediate section 26.

As can be seen clearly in Figure 5, the mast legs are constructed of structural channels with the flanges thereof turned outwardly, and the lower ends of the upper section legs 91 and 92 are converged at their lower ends and secured, as by welding, to a transverse hollow beam 96. The converging of the legs 91 and 92 to their connection with the hollow beam 96 results in locating the thrust transfer point as between the upper and intermediate mast sections in a vertical plane which passes substantially through the footings and the crown block at the top of the mast. Thus, when the mast is subjected to hoisting loads, there is no horizontal couple tending to cause a buckling of the mast columns. A thrust-transferring latch mechanism, to be described in more detail hereinafter, is contained within the beam 96 and serves to interconnect the intermediate section 26 with the upper section 27, insofar as vertical thrust is concerned.

The actual lifting of the upper mast section 27 is accomplished by means of a hoisting line or cable 100, which extends from the winch drum of the draw works 22 upwardly through a fairlead block 101 over an upper idler sheave 102 mounted in a pillow block 103 supported on the upper end of the far panel of the intermediate mast section 26. From the sheave 102, the hoisting line 100 extends downwardly and under a pair of laterally spaced sheaves 104 mounted on transverse shafts 105 journaled in pillow blocks 106, which in turn are secured to the inner surfaces of the upper mast legs 90 and 92. From the sheave 104 on the driller's side of the upper mast section 27, the hoisting line 100 extends upwardly and in anchored at 107 to the upper end of the side panel of the intermediate section 26 on the driller's side.

It will be appreciated that the foregoing reeving of the hoisting line 100 provides a 2:1 mechanical advantage in lifting the upper mast section 27 by drawing in the hoisting line 100. The hoisting line 100 may be adapted for detachable conection to the winch drum so that the hoisting line 100 is wound on top of the main draw works cable during the raising operation, and unwound and detached from the winch after the derrick mast has been raised. Details of such an arrangement are disclosed in the aforesaid U. S. Patent No. 2,781,108.

One of the objects of the present invention is to provide safety means to prevent accidental dropping of the upper mast section 27. Such means herein is responsive to tension in the hoisting cable 100. As is best seen in Figures 5 and 10, the hoisting cable 100 engages an idler sheave 110 positioned intermediate the two lifting sheaves 104. The sheave 110 is rotatably mounted between the arms of a clevis-like member 111, and the latter is secured to the end of a vertical tension rod 112, which extends downwardly through a central aperture in a transverse girt 113 extending across the top mast section 27 adjacent the lower end thereof. A compression spring 114 is mounted on the tension rod 112, and abuts at one end against the girt 113 and at the other end against a washer 115 secured to the end of the tension rod 112 by nut 116. Thus, it will be seen that downward movement of the idler sheave 110 is at all times urged by the compression spring 114.

The tension in the hoisting line 100 during the lifting of the upper derrick section 27 is, however, sufficient to overcome the downward force exerted by the spring 114 so that normally the sheave 110 remains in an upper position, indicated in Figure 10 by the reference character 110a, in which position the hoisting line 110 extends substantially straight across the bottom edges of the sheaves 104.

The shaft of the idler sheave 110 is journaled in clevis member 111 and is also pivotally engaged with the right-hand end of a lever 120 fulcrumed at 121 in a bracket 122 secured to the rear leg 91 of the upper derrick section 27 on the driller's side.

Figures 11, 12:
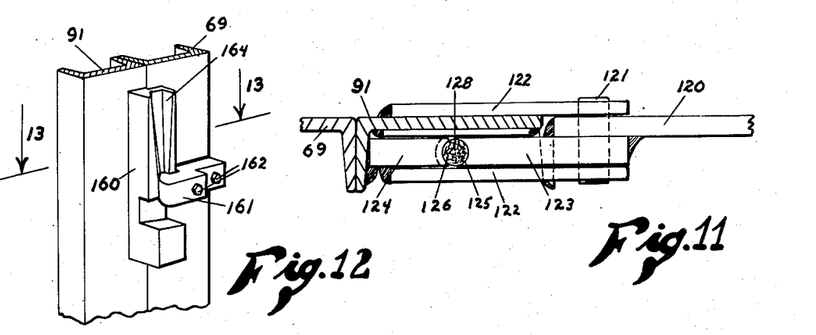
Figure 11 is a fragmentary horizontal section taken on the line 11—11 in Figure 10.
Figure 12 is an enlarged portion of Figure 5 as indicated by the arrow 12 therein.
Figure 13:
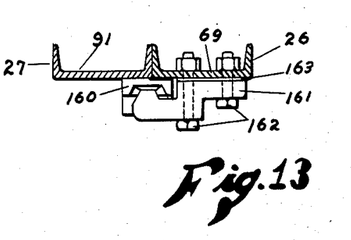
Figure 13 is a horizontal section taken on the line 13—13 in Figure 12.

To the left of the fulcrum 121 is a movable clamping shoe 123, indicated in Figure 11, formed integrally with the lever 120 and positioned against a complemental fixed clamping shoe 124 which forms a part of the bracket 122. Clamping shoes 123 and 124 are formed with complemental arcuate grooved clamping surfaces 125 and 126 so as to grip a fixed safety cable 128 whenever the lever 120 is swung in a clockwise direction about the fulcrum 121. The upper end of the safety cable 128 is non-concentric with respect to the fulcrum axis 121 whereby to provide a cam-like action of the clamping shoe 123 such that the more the lever 120 and the shoe 123 tend to rotate in a clockwise direction, the tighter the cable 128 is clamped between the fixed shoe 124 and the movable shoe 123.

Thus it will be seen that once the shoes 123—124 engage the cable 128, the weight of the upper mast section 27 itself tends to cause the clamping pressure in that the engagement of the movable shoe 123 with the fixed cable 128 tends to rotate the shoe 123 in a clockwise direction.

Thus, if the hoisting line 100 should break or the winch should fail, thus slackening the line, the restraining force holding the idler sheave 110 in its uppermost position 110a will be removed, allowing the sheave to drop to the position shown in full line in Figure 10, which action will in turn rotate the lever 120 and the shoe 123 in a clockwise direction, clamping the safety cable 128 between the shoes 123 and 124. Such action will clamp the upper mast section 27 in its then position and prevent the same from dropping to the bottom of the intermediate mast section 26.

Turning now to the discussion of the thrust-transferring latch means, reference should be had particularly to Figures 5 through 9. As can be seen most clearly in Figure 8, a pair of transversely movable latch bolts 130 are slidably received within the hollow cross beam 96. The latch bolts 130 are each formed with a spring-receiving socket 131 therein adjacent the rearward end, and a pair of compression springs 132 are mounted on a guide rod 134, which in turn is mounted on a transverse shaft 135, the ends of which are fixed in the front and rear walls of the beam 96. The inner ends of the springs 132 abuts an enlarged central portion 133 of the guide rod 134. The outer ends of the compression spring 132 are anchored in the spring sockets 131 of the latch bolts 130, and are stressed to urge both of the bolts outwardly from the center of the beam 96.

Figure 8:
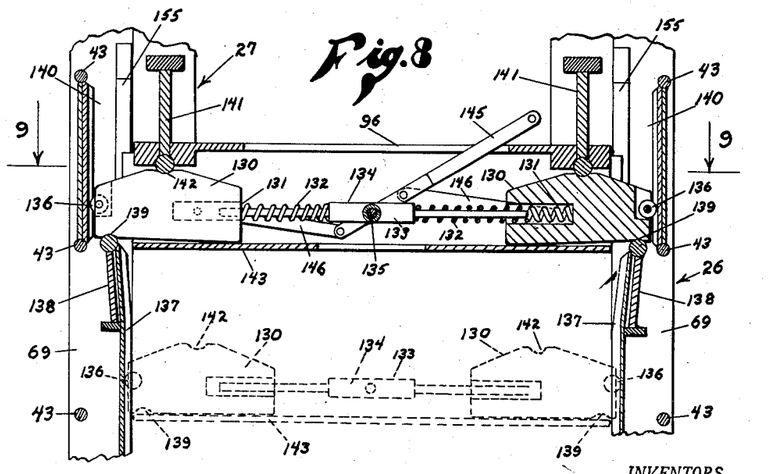
Figure 8 is an elevational section taken on the line 8—8 in Figure 6.

During the operation of raising the upper mast section 27, outward movement of the latch bolts 130 is prevented by a pair of guide rollers 136, each journaled in the outer end of one of the latch bolts 130 and running in one of a pair of vertical channels 137 secured to the inner surfaces of the side panels making up the intermediate mast section 26. As shown in Figure 8, the channels 137 terminate adjacent the upper end of the intermediate mast section 26 so as to permit the latch bolts to move outwardly under the urging of the springs 132. Such outward motion of the latch bolts 130 projects the same over the top of a pair of "bulb T" cross members 138 so as to engage a lower notch 139 in each of the latch bolts 130 with the upper or bulb edge of the cross member 138. The latch bolts 130 are suitably positioned to make such engagement by the fact that the rollers 136 engage short track sections 140 welded between adjacent rungs 43 of the intermediate mast section 26 adjacent the upper end thereof.

The downward thrust of the upper mast section 27 is taken by a second pair of bulb T cross members 141 therein, each positioned so that the bulb edge engages an upper notch 142 in the latch bolt 130. The rotative couple of the latch bolt 130 occasioned by the lateral displacement of the cross members 138 and 141 is taken by the lower wall of the hollow beam 96, as indicated at 143 in Figure 5.

Thus, it will be seen that when the upper mast section 27 is raised to the upper limit of its travel, the latch bolts 130 snap outwardly into the position indicated in Figure 8, and that subsequent slacking off on the hoisting line 100 allows the upper section to settle slightly, retaining the latch bolts 130 securely in their engaged position. It should be noted that the slight amount of settling necessary to engage the latch bolts 130 is relatively slight, and is insufficient to cause complete operation of the safety catch shoes 123—124.

Figure 9:
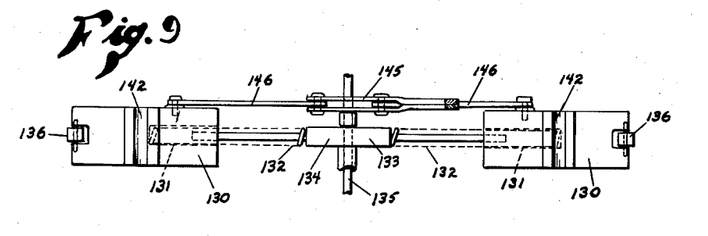
Figure 9 is a fragmentary horizontal view taken on the line 9—9 in Figure 8, showing the latch mechanism interconnecting lower and upper mast sections.

The means for retracting the latch bolts 130 in order to permit lowering of the upper mast section 27 is best seen in Figure 9. Here it will be seen that a toggle mechanism, comprising a lever 145 and a pair of toggle links 146, is interconnected between the transverse shaft 135 and the respective latch bolts 130, all of the interconnections being pivotal.

Counterclockwise rotation of the lever 145 about the shaft 135 draws the latch bolts 130 inwardly against the urging of the compression springs 132 whereby to release the latch bolts from their respective engagement with the bulb T members 138—141. It will be realized that, in order to retract the latch bolts 130, it is necessary to "take a lift" on the hoisting line 100 whereby to lift the upper mast section 27 slightly and release the bulb edges of the members 138 and 141 from the notches 139 and 142, respectively, in the latch bolts 130. Operation of the latch release mechanism 145—146 is effected by means of a lock trip line 150 secured to the outer end of the lever 145 and passed over an appropriately mounted sheave 151, and thence downwardly to the base of the mast.

It will be appreciated that, in order to prevent whipping or other undesirable lateral movement of the upper mast section 27 with respect to the intermediate mast section 26, it is necessary that these two sections be firmly locked together, preferably at two vertically spaced points. The lowermost locking engagement is effected by providing lateral extensions on the cross beam 96 which pass between a pair of inwardly extending guide tracks 155 formed in each side panel of the intermediate mast section 26. The nature of these guides is best seen from an examination of Figure 6, wherein it will be seen that relative forward or rearward movement of the lower end of the upper mast section 27 with respect to the intermediate mast section 26 is prevented by the fact that the ends of the cross beam 96 are closely embraced between the guide tracks 155 at each end thereof.

The relative interlocking of the mast sections 26 and 27 at a point above the lower ends of the upper section 27 is effected by four locking wedge assemblies, the nature of which is best seen from an examination of Figure 12. Four such wedge assemblies are provided so as to interconnect the respective front and back legs of each side panel of the intermediate and upper mast sections. Each wedge assembly includes a notched socket member 160 secured, as for example by welding, to a leg of the upper mast section 27, and positioned to engage a locking plug or wedge member 161 secured to the corresponding leg of the intermediate mast section 26. When the top section 27 is raised, the plug of the member 161 slides into the notch of the socket member 160. As can be seen best in Figure 12, the notch in each socket member 160 forms an open-sided, vertically tapered socket. The wedge member 161 is secured to its respective leg by removable means, such as bolts 162, and shims 163 are provided whereby the relative position of the wedge 161 and the socket member 160 may be adjusted to provide a tight locking fit when the upper mast section 27 is in operative position. The taper of the socket 164 in the member 160 is sufficiently gradual so that the small amount of settling of the upper mast section 27 necessary to engage the latch bolts 130 still leaves the wedge assembly 160—161 in relatively tight engagement.

Figure 15:
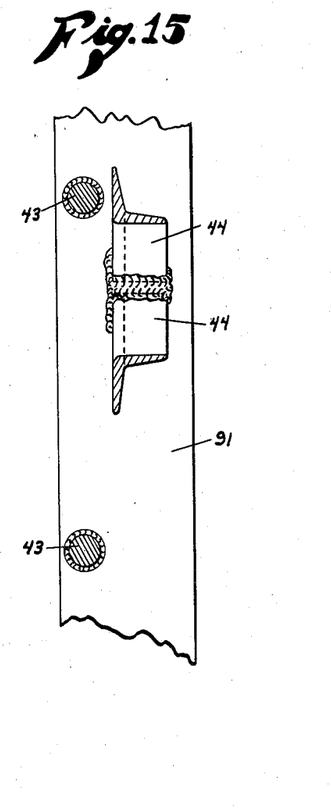
Figure 15 is an enlarged elevational section taken on the line 15—15 in Figure 14.

As can be seen best in Figure 15, the rungs 43 are welded between the front and back legs of each panel section adjacent the outer edges of the legs, whereas the diagonal bracing 44 is welded adjacent the inner edges of the legs. Thus each of the side panels of the mast sections comprises in effect a truss girder. It will be noted that bending stresses tending to urge the front and rear legs of any panels together are taken in direct thrust by the rungs 43 while parallel shifting of the two legs relative to each other is prevented by the diagonal braces 44. Furthermore, the fact that the rungs are adjacent the outer edge of the legs and the diagonal braces are adjacent the inner edge strengthen the mast panels against twisting forces. The just-described mast construction provides a very rigid and strong mast without materially increasing the weight thereof as compared to conventional structures.

It will also be noted that the lateral displacement of the rungs 43 and braces 44 provides ample toe room for workmen using the ladder comprised of the rungs 43.

Figure 14:
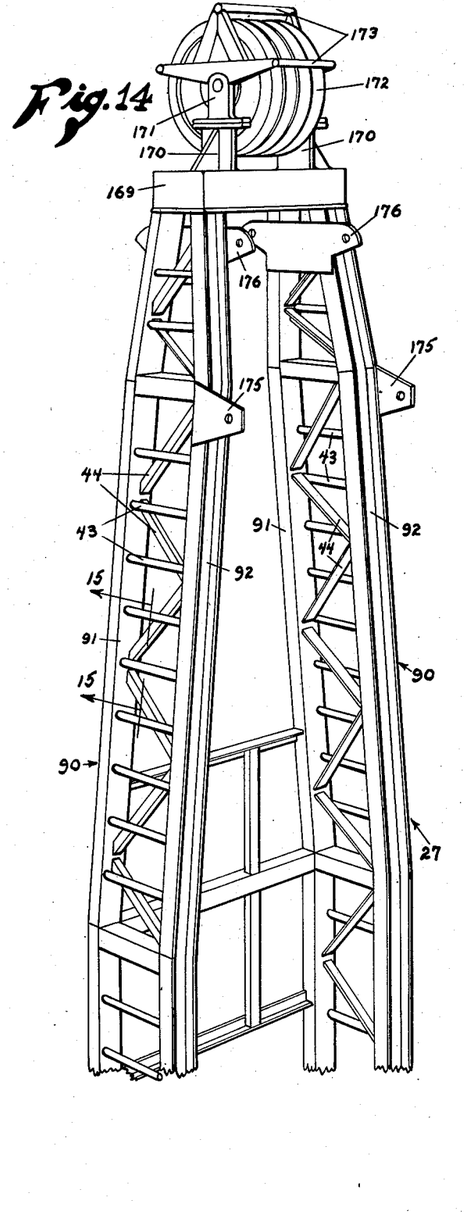
Figure 14 is a fragmentary perspective view of the upper portion of the derrick mast adjoining that shown in Figure 5, as seen from the same direction as in Figures 2 and 5.

Referring to Figure 14, it will be seen that the upper ends of the upper mast section 27 converge and have secured across the top ends thereof a box-like cross member 169 forming a water table on which is mounted a pair of upstanding pedestals 170 which in turn support pillow blocks 171 in which a transverse shaft for crown block sheaves 172 is journaled. A conventional cable guard 173 surrounds the crown block sheaves 172 to prevent accidental disengagement of the main hoisting line from the sheaves.

The reeving of the main hoisting line and traveling block being conventional, it requires no additional description herein. Suffice it to say that, due to the construction hereinbefore described, it is unnecessary to unreeve the main hoisting line in order to raise or lower the mast sections.

Conventional anchor tabs 175 and 176 are mounted on the upper mast section just below the water table 169, so that forwardly and rearwardly extending guides may be attached to the mast and anchored to the ground in cases where severe operating conditions may require such guying.

A pipe-racking platform 177 is pivotally mounted by hinge brackets 179 (see Figure 5) to the front legs of the intermediate mast section 26 so as to fold into the transportation position shown in full line in Figure 1, or alternatively to extend forwardly in the horizontal operating position indicated in phantom line in Figure 1. Diagonal supporting guys 178 serve to support the pipe-racking platform 177 in its operative, horizontal position.

It will be appreciated that, due to the fact that the entire front of the mast herein is open, free operation of a conventional traveling block and free manipulation of drill pipe sections is permitted, even when the mast is in a substantially vertical position. In order to space the well sufficiently forward of the mast base to permit use of rotary tables and other drilling and servicing equipment, however, it is preferred to lean the mast forward slightly, supporting the same where necessary with rearwardly extending guys attached at the upper end of the tabs 176 and anchored to either the grounds or, if desired, to the chassis 20.

While the derrick structure shown and described herein is fully capable of achieving the objects and providing the advantages hereinbefore stated, it will be realized that it is capable of some modification without departure from the spirit of the invention. For this reason, we do not mean to be limited to the form shown and described, but rather to the scope of the appended claims.

We claim:

1. In combination in a telescoping derrick mast of the type having lower and upper, multiple-legged sections, relatively movable from a lowered, coextensive position to a raised, extended and aligned position in which said sections lap each other by a predetermined length, means for interlocking said sections in said raised position comprising: a plurality of plug and socket assemblies each having a socket member secured to a leg of one of said sections and spaced from the lapping end thereof by an amount substantially equal to said predetermined length, and a plug member secured to the lapping end of a corresponding leg of the other section and positioned to make locking engagement with said socket member when said sections are extended, each of said socket members having a vertically tapered, open-sided notch therein, and each of said plug members having a vertically tapered, wedge-shaped portion aligned to make wedging engagement with said notch.

2. A derrick mast comprising in combination: a first mast section having at least one vertical structural panel; a second mast section having a structural panel parallel to, and lapping that of said first section, said second section being slidably coupled to said first section for vertical movement from a retracted position substantially coextensive with said first section to a raised extended position aligned with said first section; a latch mechanism carried by one of said sections and including at least one latch bolt mounted adjacent said panels for horizontal movement from a retracted position to an extended position in which said bolt extends through the planes of both said panels; a spring connected in said latch mechanism to urge said bolt toward said extended position thereof; a vertically extending track in one of said sections substantially coextensive therewith and engaged with said bolt to retain said bolt in said retracted position thereof except when said second section is in fully extended position; a transverse, thrust-receiving cross member in the panel of said first section below said bolt for thrust-transferring engagement therewith when said section is extended; and a second transverse, thrust-receiving member in the panel of said second section, positioned above said bolt when said second section is extended for thrust-receiving engagement with said bolt when the same is extended, said bolt having a depression formed in a horizontal surface thereof to receive one of said transverse members whereby to prevent retraction of said bolt when engaged with said transverse member.

3. In combination in a telescoping derrick mast of the type having lower and upper sections relatively movable from a lower coextensive position to a raised, extended and aligned position in which predetermined lengths of said sections overlap each other, means for interlocking said sections in said raised position comprising: a socket member secured to one of said sections spaced from the lapping end thereof by an amount substantially equal to said predetermined length; and a plug member shaped complementally to said socket member, secured to the lapping end of the other section, and positioned to enter and make locking engagement with said socket member when said sections are extended with said socket and plug members being tapered vertically to make wedging engagement.

4. The construction of claim 3 further characterized in that one of said members is adjustable in a horizontal direction to align the same with said other member.

5. A derrick mast comprising in combination: a lower mast section and an upper mast section, each section having a pair of spaced, parallel side panels, said sections being telescopingly coupled together, one within the other, with respective panels thereof in parallel sliding engagement for vertical movement of said upper section from a lower, retracted position coextensive with said lower section, to an extended position in which terminal portions only of said sections lap each other; and thrust-transferring latch means for said sections to interlock the same in said extended position to form a single structural column, said latch means comprising a transverse beam interconnecting the inner pair of said panels adjacent the lapping ends thereof, said beam having horizontal guide means therein, a pair of latch bolts slidably positioned in said guide means for reciprocal movement to project and retract said bolts from the ends of said beam, said bolts when projected each extending through the plane of an outer side panel, spring means engaging said bolts and anchored against said beam to urge said bolts into projected position, a horizontal abutment member in each inner panel and a horizontal abutment member in each outer panel so positioned that said bolts and abutments pass each other when said upper section is extended, to thereafter engage the adjacent bolt when the same is projected and said upper section is lowered slightly to interlock said sections as aforesaid, said bolts each having depressions formed in opposite surfaces thereof to receive said abutment members when lowered slightly as aforesaid whereby to prevent withdrawal of said bolts when said upper section is locked in extended position.

(References on following page)

References Cited in the file of this patent

UNITED STATES PATENTS

| | | |
|---|---|---|
| 1,862,621 | Heilmann | June 14, 1932 |
| 2,129,466 | Ferguson | Sept. 6, 1938 |
| 2,331,558 | McEwen et al. | Oct. 12, 1943 |
| 2,364,851 | Johansen | Dec. 12, 1944 |
| 2,576,389 | Craighead et al. | Nov. 27, 1951 |
| 2,589,080 | Heinish | Mar. 11, 1952 |
| 2,617,500 | Cardwell et al. | Nov. 11, 1952 |
| 2,685,353 | Caskie | Aug. 3, 1954 |
| 2,689,549 | Hayman | Sept. 21, 1954 |

FOREIGN PATENTS

| | | |
|---|---|---|
| 34,278 | Austria | Apr. 1, 1908 |